United States Patent [19]

Lyden

[11] Patent Number: 6,055,933
[45] Date of Patent: May 2, 2000

[54] APPARATUS FOR CONTROLLING FEED DELIVERY

[76] Inventor: Stephen R. Lyden, 16776 Bernardo Center Dr., Suite 203, San Diego, Calif. 92128

[21] Appl. No.: 09/294,079

[22] Filed: Apr. 19, 1999

[51] Int. Cl.⁷ ..................................................... A01K 5/00
[52] U.S. Cl. .............................. 119/58; 119/51.11; 119/53
[58] Field of Search .............................. 119/51.11, 51.12, 119/52.1, 53, 58, 60

[56] References Cited

U.S. PATENT DOCUMENTS

| | | | |
|---|---|---|---|
| 3,013,529 | 12/1961 | Parker et al. | 119/53 |
| 3,638,618 | 2/1972 | Strother | 119/51.12 |
| 4,171,684 | 10/1979 | Herr et al. | 119/52.1 |
| 4,422,409 | 12/1983 | Walker et al. | 119/51.11 |
| 4,671,210 | 6/1987 | Robinson et al. | 119/51.12 |
| 4,976,222 | 12/1990 | Cooke | 119/60 |
| 5,188,060 | 2/1993 | Johnson | 119/58 |
| 5,377,620 | 1/1995 | Phillippi | 119/51.12 |
| 5,394,832 | 3/1995 | Briley | 119/58 |
| 5,483,923 | 1/1996 | Sabbara | 119/51.11 |
| 5,921,200 | 7/1999 | Bondarenko et al. | 119/53 |
| 5,970,912 | 10/1999 | Supple et al. | 119/51.11 |

*Primary Examiner*—Peter M. Poon
*Assistant Examiner*—Elizabeth Shaw
*Attorney, Agent, or Firm*—William Patrick Waters

[57] ABSTRACT

Apparatus for controlling automatically the delivery of feed, such as hay flakes, to a feeding receptacle. The apparatus includes an housing having an upper feed receiving portion and a lower feed delivering portion, the lower portion having an opening for passage of feed into the receptacle. A first door is disposed in the housing between the upper feed receiving portion and the lower feed delivering portion, the door being movable between a closed condition preventing feed from entering the lower portion and an opened condition permitting feed to enter the lower portion. A second door disposed in the upper feed receiving portion enables delivery of feed thereto. A cable interconnects the first and second door to hold one door in a closed condition when the other door is opened. An electromagnet, coupled to an electrical timer, controls operation of the first door so that feed is delivered automatically to the receptacle at a predetermined time.

20 Claims, 4 Drawing Sheets

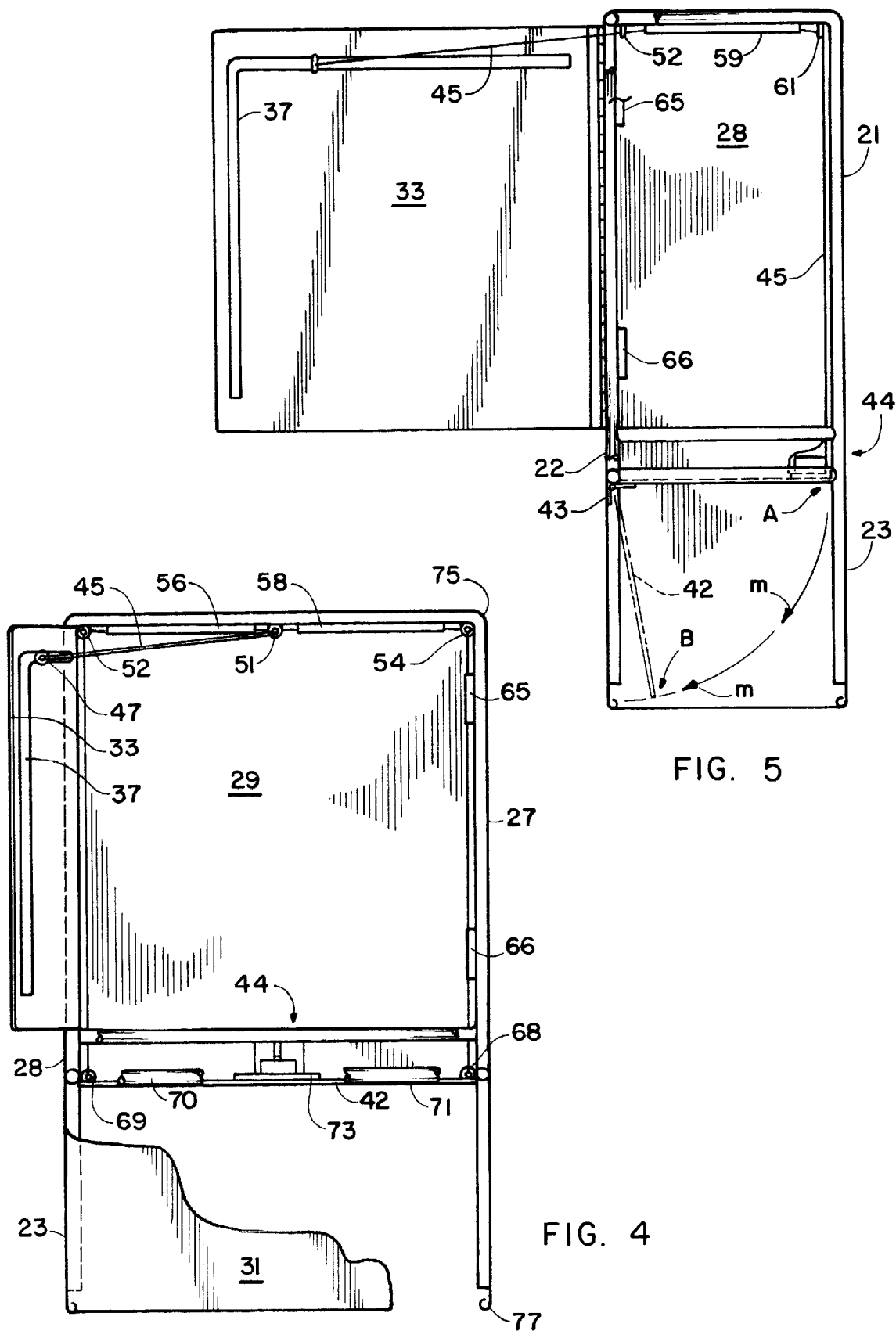

APPARATUS FOR CONTROLLING FEED DELIVERY

BACKGROUND OF THE INVENTION

The present invention relates generally to animal husbandry and, more particularly, to apparatus for controlling delivery of feed to equine feeding receptacles.

The problems relating to animal feeding, especially in the case of horses, are well known. For example, several reasons exist for not feeding a horse from the ground. These include the economic where loss or contamination of feed occurs when the feed is exposed to the environment. In addition, such feeding can result in disease transmission to the animal and, in some cases, loss of the animal because of parasitic infection or colic.

Conventional feeding systems useful for other animals do not work well with horses. For example, covered feed troughs that can efficiently service hogs have little value in feeding horses. Open, communal troughs also fail because of resistance of the horse to feed in proximity to other animals.

Further, conventional feeders lack means for regulating the amount of feed available to the horse and, in addition, lack means for regulating the times of feeding.

In addition, horses are especially sensitive to sudden or unusual sounds and these can seriously disturb the animal. In some cases, prior art feeders are noisy in operation and disconcerting to the horse. Use of such feeders can result in inadequate feeding and ultimately, threats to the health of the horse.

From the foregoing it is apparent that a need exists for a horse feeding apparatus that avoids the problems relating to feeding from the ground and is efficient in operation. Desirably, such an apparatus would be capable of automatically delivering feed, such as hay flakes, at predetermined times in a quiet manner so as not to disturb the horse. In a preferred embodiment, the horse feeding apparatus would be constructed of readily available material and would be designed to afford the horse easy access to the feed.

DISCLOSURE OF THE INVENTION

The invention disclosed herein satisfies the above described needs in a novel manner. According to the present invention, there is provided an apparatus for controlling automatically the delivery of feed, such as hay flakes, to a feeding receptacle. The apparatus includes an housing having an upper feed receiving portion and a lower feed delivering portion, the lower portion having an opening for passage of feed into the receptacle. A first door is disposed in the housing between the upper feed receiving portion and the lower feed delivering portion, the door being movable between a closed condition preventing feed from entering the lower portion and an opened condition permitting feed to enter the lower portion. A second door disposed in the upper feed receiving portion enables delivery of feed thereto. A cable interconnects the first and second door to hold one door in a closed condition when the other door is opened. An electromagnet, coupled to an electrical timer, controls operation of the first door so that feed is delivered automatically to the receptacle at a predetermined time.

An apparatus embodying the invention is easy to install, mechanically simple, economical and easy to use. It does not produce sounds to upset the animal and it can be loaded from outside a stall so that the loading function is not seen by the horse.

Other aspects and advantages of the present invention will become apparent from the following detailed description, taken in conjunction with the accompanying drawings, illustrating by way of example the principles of the invention.

BRIEF DESCRIPTION OF DRAWINGS

FIG. 4 is a front elevational view of the feeding apparatus of the present invention, showing a portion of the front wall cut away;

FIG. 5 is a right side elevational view of the feeding apparatus of the present invention, the right side wall having been removed;

FIG. 7 is an unscaled schematic view of the trap door control mechanism of the feeding apparatus of the present invention.

BEST MODE FOR CARRYING OUT THE INVENTION

Figure 1:
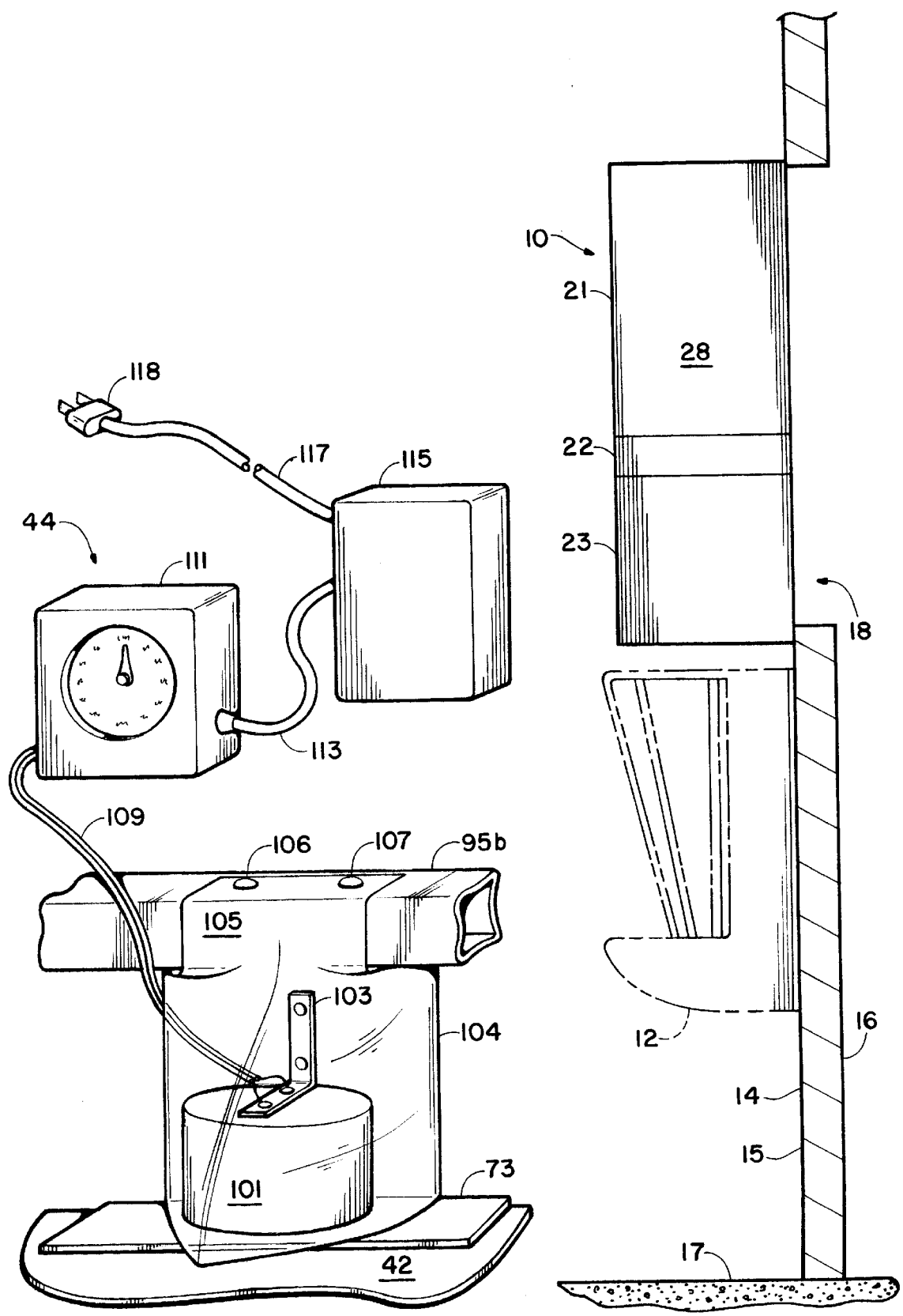
FIG. 1 is a left side perspective view of a feeding apparatus constructed according to the present invention showing the apparatus installed in a horse stall.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

In the following detailed description and in the several Figures of the drawings, like elements are identified with like reference numerals.

Referring now to the drawings and, in particular, to FIGS. 1 through 5 thereof, there is shown a feeding apparatus 10 which is constructed according to the present invention. The feeding apparatus 10 can be utilized both indoors and out and is shown mounted, in a conventional manner, to a wall 14 which is anchored to a stable floor 17. For purposes of convenience, the wall 14 may be regarded as having a front side 16 from which feed, often in the form of hay flakes, is loaded into the apparatus 10, and a rearward side, from which the horse feeds. A conventional hay feeder 12 is mounted on the rear side 15 of the wall 14. In a typical case, the hay feeder 12 has a height of about 25 inches and it is mounted about 20 inches from the floor 17. The feeding apparatus 10 is fixed to the wall 14 about four feet from the floor 17 and is separated from the hay feeder 12 by about 2 inches.

Preferrably, the feeding apparatus 10 is fixed at a stall door opening 18 in the wall 14 which enables a user of the apparatus 10 to load it with hay, or other suitable feed, from the stable aisle. In this manner, the apparatus can be replenished without disturbing a horse on the other side.

The feeding apparatus 10 includes an upper hay flake receiving portion 21, an intermediate grain tray 22 and a lower hay flake delivering portion 23. Again, for purposes of convenience, the feeding apparatus 10 may be regarded as having a left side wall 28 as shown in FIG. 1.

Figure 2:
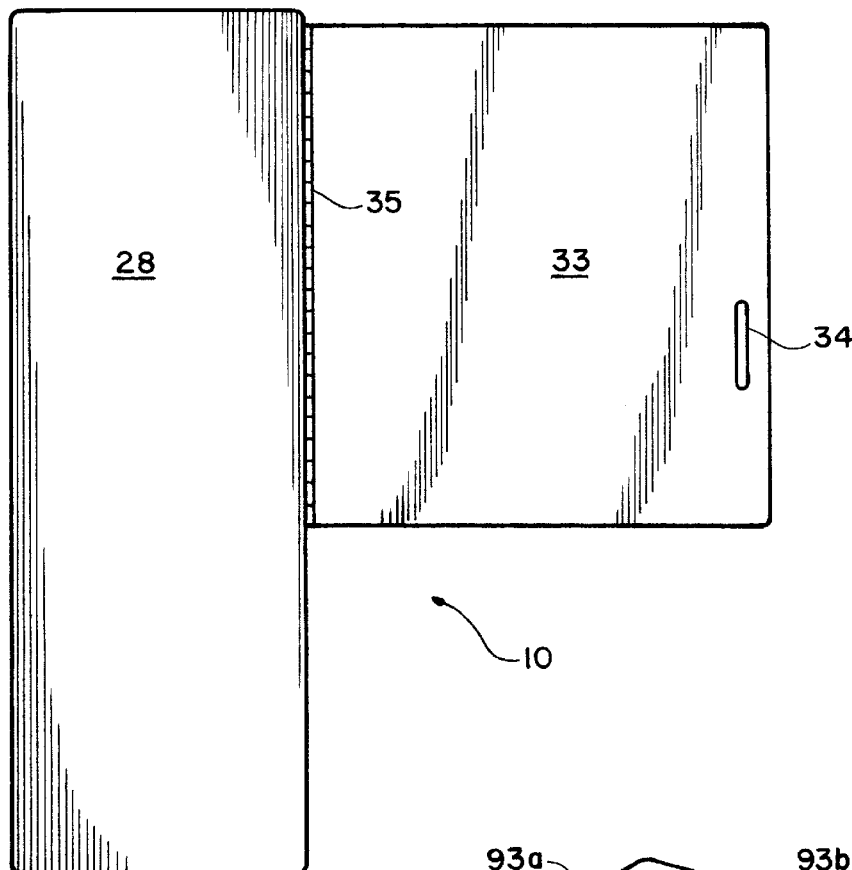
FIG. 2 is a left side elevational view of the feeding apparatus of the present invention.
Figure 3:
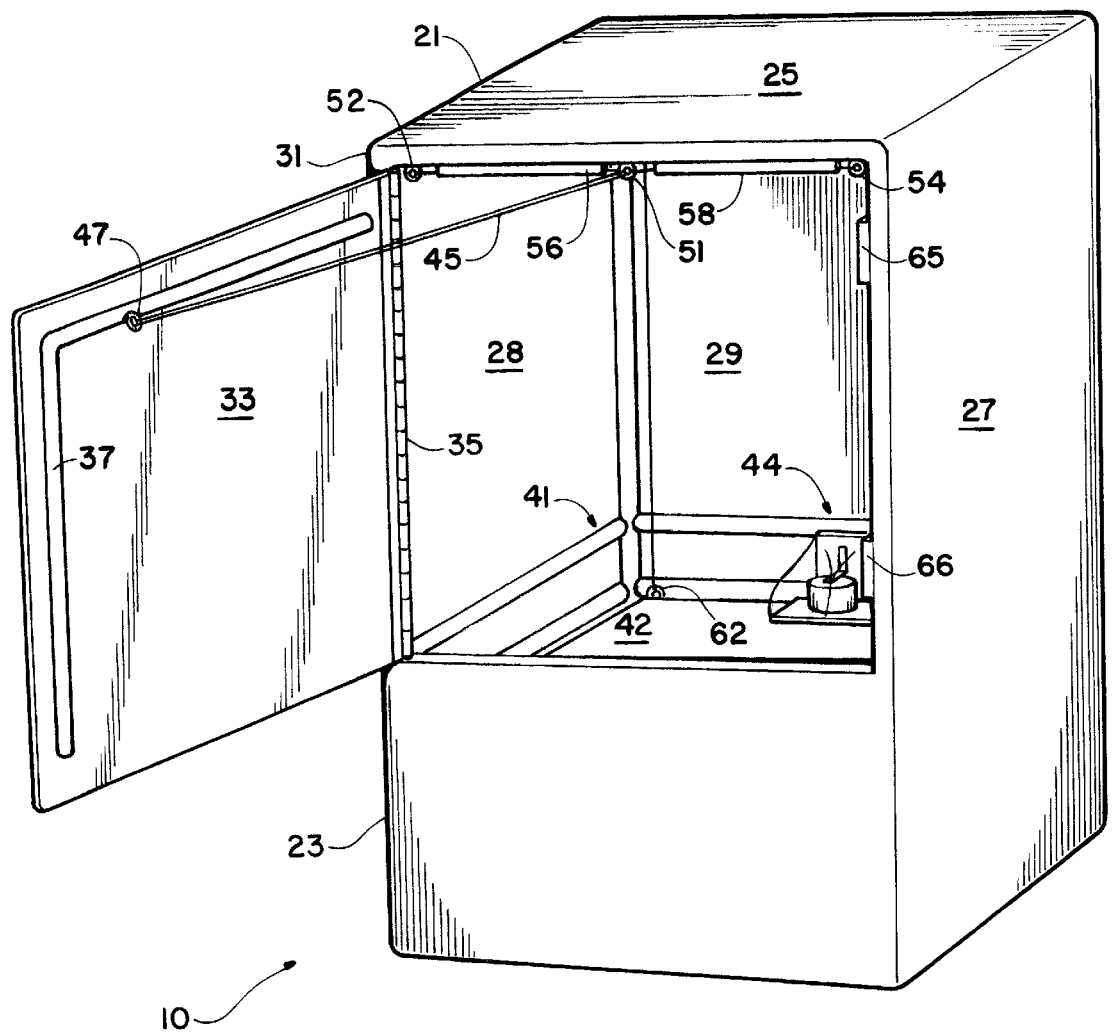
FIG. 3 is a front perspective view of the feeding apparatus of the present invention.

As shown in FIGS. 2 and 3, the feeding apparatus 10 is generally of elongated rectangular sheet metal construction having a top wall 25, a right side wall 27, a rear wall 29 and a front wall 31. A door 33 affording access to the upper hay flake receiving portion 21, is hingedly connected at a piano hinge 35 to the front wall 31. A handle 34 is provided for ease of opening and closing the door 33 and a stiffening member 37 is affixed to the inside surface of the door 33 to reduce bending or torquing of the door during use.

A trap door 42 separates the upper hay flake receiving portion 21 from the lower flake delivering portion 23 and is hingedly connected at the inside surface of the front wall 31 by a hinge 43. Operation of the trap door is controlled by a trap door control mechanism 44 which will be discussed in greater detail below, in reference to FIG. 7.

The feeding apparatus 10 of the present invention is constructed so that the trap door 42 is interconnected by means of a cable 45 to the access door 33. As more fully discussed below, the trap door 42 is limited from moving into a feed delivering condition while the access door 33 is open. This is accomplished by the cable 45 which has its origin and termination at a rivet 47 by which it is fixed to the strengthening member 37 on the inner surface of the access door 33.

Figure 6:
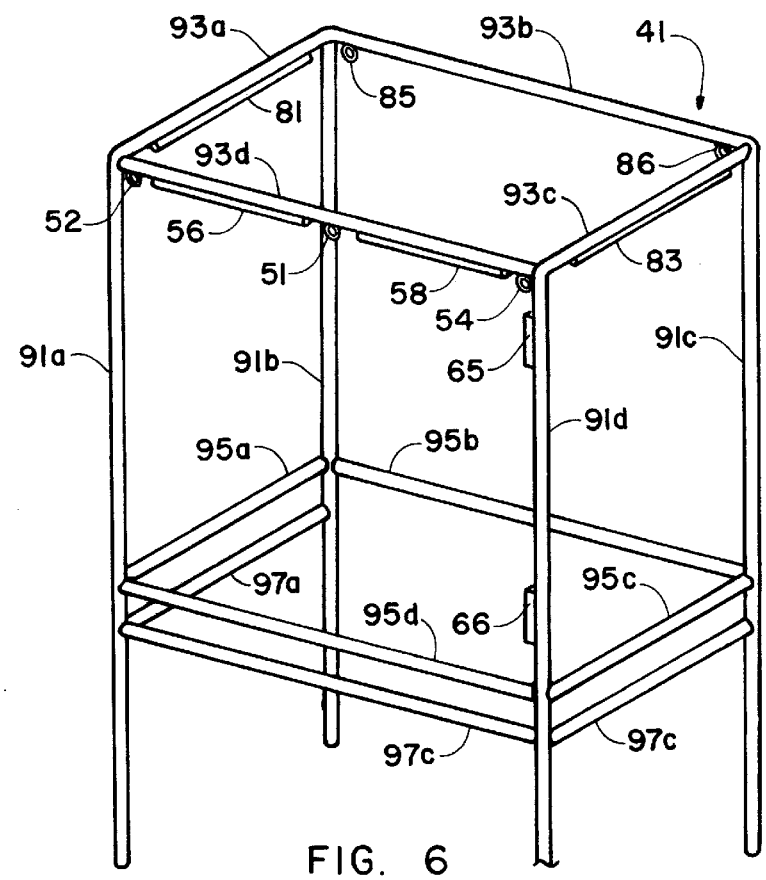
FIG. 6 is a perspective view of the tubular frame of the feeding apparatus of the present invention.

With reference now to FIG. 6, there is shown the skeletal frame 41 of the feeding apparatus 10 of the present invention. It will be recognized by those skilled in the art that other forms of construction and support are equally useful and are within the contemplation of the present invention. The skeletal frame 41 is comprised of vertical supports 91a–d, upper horizontal supports 93a–d and interconnected intermediate supports 95a–d which, in turn, are connected to lower intermediate supports 97a–c. While cylindrical tubing may be utilized, ¾ inch square tubing is preferred. A pair of magnets 65 and 66 are mounted on the assembly 41 to aid in holding the access door 33 closed.

In a preferred embodiment of the invention, a grain tray 22 is interposed between the upper hay flake receiving portion 21 and the lower hay flake delivering portion 23. The grain tray is in direct communication with the upper portion and is adapted to receive grains and similar feeds. Of course, opening of the trap door 42 results in delivery of the grain tray contents to the lower delivering portion 23 and, ultimately, to the hay feeder 12.

The function of the cable 45 will now be considered in detail. As mentioned above, the cable 45 is utilized to limit the conditions under which the trap door 42 can be opened. The cable is a loop having an origin and termination at a spot weld on the access door stiffening member 37. From here, the cable is guided by means of strategically placed eyelets and tubular guides along the inner wall surfaces of the upper hay receiving portion 21 and across the top surface of the trap door 42. While the cable 45 is in the form of a single loop, for convenience of description it may be regarded as having a left leg and a right leg. As best seen in FIGS. 3–5, the cable left leg is routed through a front eyelet 51 from whence it passes through a guide tube 56 and, at an eyelet 52, its course is changed and it is routed toward the rear of the upper portion 21 through a guide tube 59 and an eyelet 61. At the eyelet 61, the cable direction turns downwardly to pass through an eyelet 69 and a guide 42, both of which are fixed to the upper surface of the trap door 42.

In a similar manner, the right cable leg passes from the spot weld 47 and, at the eyelet 51, turns right and passes through the tube guide 58 and an eyelet 54. As in the case of its counterpart, this leg is routed ultimately through an eyelet 18 and a guide 71, both of which, are also fixed to the upper surface of the trap door 42.

In a preferred embodiment, the guide tubes, such as the right and left guide tubes 56 and 58 are of metal composition having an outside diameter of about ⅜ inch. With the exception of the guide tubes 70 and 71, the tubes are spot welded to the skeletal frame 41. The eyelets also, except for the eyelets 68 and 69 are fixed to the frame 41. It will be clear to one skilled in the art that the cable 45, together with the associated guide tubes and eyelets enable the access door 33 and the trap door 42 to cooperate in their operation. In addition, the guide tubes and eyelets, by guiding the cable close to inner wall surfaces, keep the cable secure from fouling by any material introduced into the feeding apparatus 10.

Referring now to FIG. 7, the trap door control apparatus 44 is shown in schematic form. The control apparatus 44 includes an electromagnet 101 attached by a bracket 103 to a plate 105. The plate 105 is, in turn fixed at spotwelds 106 and 107 to the tubular skeletal member 95b. A suitable shield 104, of plastic or metal construction, is fixed to the plate 105 and covers the electromagnet 101 to keep it isolated from feed and for preventing feed becoming interposed between the electromagnet 101 and the trap door magnetic plate 73. An electrical lead 109 couples the electromagnet 101 to a conventional timer 44 which, in turn, is coupled by a lead 113 to a transformer 115. The transformer 115 can be connected to a 110 VAC electrical power supply, in a conventional manner, by a plug 118 at the end of a cord 117 coupled to the transformer. Thus, in a preferred embodiment of the invention, the transformer 115 serves to convert the electrical energy to 12VDC in a conventional manner. A magnet plate 73, preferably about 2¼ inches by about 5 inches, is mounted on the upper surface of the trap door 42 for releasable engagement with the electromagnet 101.

Considering now the operation of the feeding apparatus 10. At a suitable time, the user can introduce hay flakes or grains and other food stuff by opening the access door 33 into the upper hay flake receiving portion 21. As noted earlier, while the access door 33 is open, the trap door 42 is maintained by the cable 45 in a closed condition. After the access door 33 is closed and tension on the cable 45 is relieved, the trap door, under control of the trap door control apparatus 44, opens at a predetermined time, according to the time set by the user on the timer 111.

When the predetermined time for feeding arrives the timer 111 interrupts electrical current to the electromagnet 101 and the trap door 42 is released. As shown in FIG. 5, the trap door 42 moves from a closed position A to an opened condition B as it moves along the arc described by arrows M. As the trap door 42 opens, it allows feed to pass from the upper hay flake receiving portion 21 into the lower hay flake delivering portion 23 and thence out into the hay feeder 12.

In the field, operations of the access door 33 for replenishing food, and the trap door 42 in delivering the food, have proven to be smooth and relatively quiet. As a result, the feeding apparatus 10 has substantial utility since it is not startling or threatening to a horse.

It will be evident that there are additional embodiments and applications which are not disclosed in the detailed description but which clearly fall within the scope of the present invention. The specification is, therefore, intended not to be limiting, and the scope of the invention is to be limited only by the following claims.

What is claimed is:

1. Apparatus for controlling the delivery of feed to a feeding receptacle, comprising:

an housing, said housing having an upper feed receiving portion and a lower feed delivering portion, said lower portion having an opening for passage of feed from said lower portion into said receptacle;

a first door, disposed in said housing between said upper feed receiving portion and said lower feed delivering portion, said door being movable between a closed condition preventing feed from entering said lower portion and an opened condition permitting feed to enter said lower portion;

a second door disposed in said upper feed receiving portion for enabling delivery of feed to said upper portion; and means connecting said first and second doors whereby one of said doors is prevented from opening when the other one of said doors is open.

2. The apparatus according to claim 1, wherein said connecting means is a cable fixed at one end to said first door and fixed at another end to said second door.

3. The apparatus according to claim 2, wherein said upper feed receiving portion includes cable guiding means.

4. The apparatus according to claim 3, wherein said cable guiding means includes a plurality of tubes disposed on the inside of said upper feed receiving portion.

5. The apparatus according to claim 1, including means for controlling the times at which said first door is opened.

6. The apparatus according to claim 5, wherein said means for controlling includes an electromagnet.

7. The apparatus according to claim 6, wherein said means for controlling includes an electrical timer coupled to said electromagnet.

8. The apparatus according to claim 6, wherein said first door includes a ferromagnetic plate for releasable engagement with said electromagnet.

9. The apparatus according to claim 6, wherein said housing includes means for shielding said electromagnet from said feed.

10. The apparatus according to claim 9, wherein said means for shielding is a plate fixed to an inside wall of said housing.

11. The apparatus according to claim 6, wherein said upper feed receiving portion includes a lower end and said electromagnet is disposed adjacent said upper feed receiving portion lower end.

12. The apparatus according to claim 1, including hinge means for attaching said first door to said housing.

13. The apparatus according to claim 1, wherein said housing includes a grain tray disposed in said housing between said upper feed receiving portion and said lower feed delivering portion.

14. An equine feeding apparatus for controlling delivery of hay flakes to a feeding receptacle, comprising:

an elongated housing, said housing including an upper hay flake receiving portion and a lower hay flake delivering portion;

a door, disposed between said upper hay flake receiving portion and said lower hay flake delivering portion, said door being movable between a closed condition for preventing passage of a hay flake from said upper portion to said lower portion and an opened condition for permitting passage of a hay flake from said upper portion to said lower portion;

a second door disposed in said upper hay flake receiving portion for enabling delivery of hay flakes to said upper portion;

means connecting said first and second doors whereby one of said doors is prevented from opening when the other one of said doors is open; and means for controlling the times at which said first door is moved to an opened condition for permitting passage of a hay flake from said lower portion into said receptacle.

15. The apparatus according to claim 14, wherein said means for controlling is an electrical timer.

16. The apparatus according to claim 15, wherein said means for controlling further includes an electromagnet coupled to said timer.

17. The apparatus according to claim 14, wherein said housing includes a lid for covering said hay flake receiving upper portion.

18. The apparatus according to claim 14, wherein said housing includes a rear wall having said second door hingedly attached thereto.

19. The apparatus according to claim 14, wherein said housing includes a side wall having said second door hingedly attached thereto.

20. The apparatus according to claim 14, wherein said housing includes a grain tray disposed between said hay flake receiving upper portion and said hay flake delivering lower portion.

* * * * *